(No Model.)
S. COOPER.
HARROW.
No. 382,513. Patented May 8, 1888.
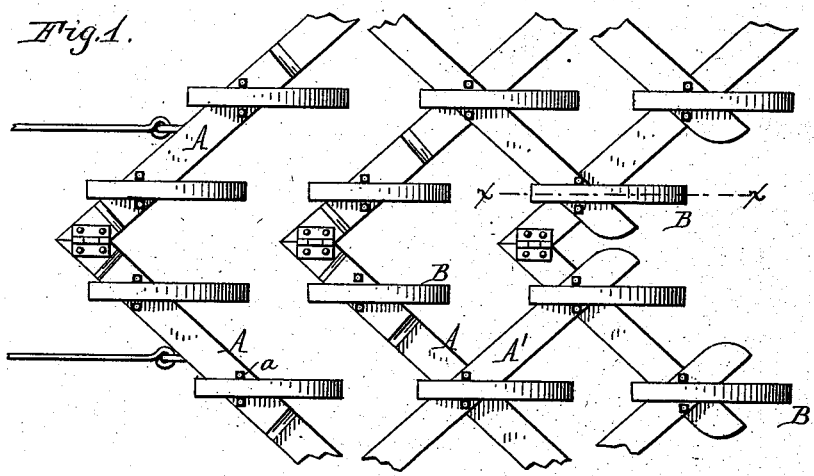
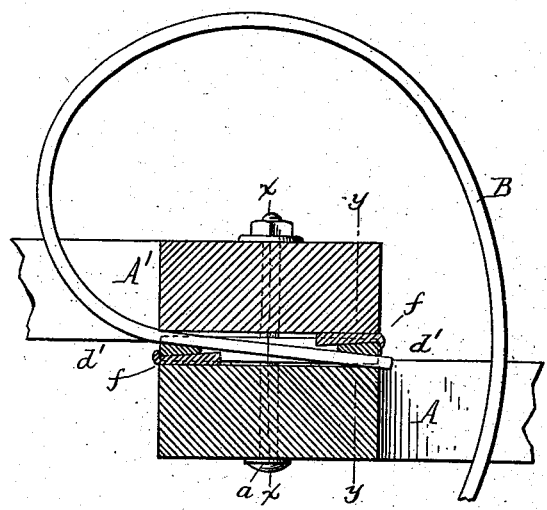
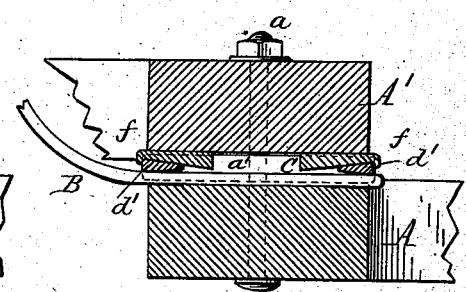
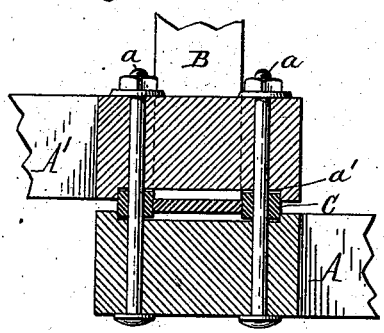
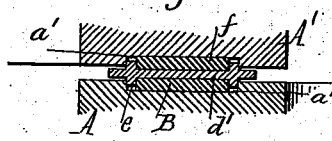
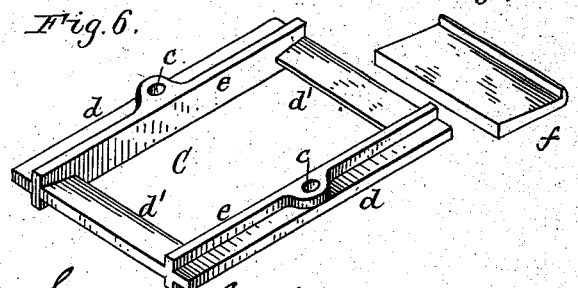
Witnesses:
Theo. L. Popp
Geo. J. Buchheit Jr.
Samuel Cooper. Inventor.
By Wilhelm & Bonner
Attorneys

UNITED STATES PATENT OFFICE.

SAMUEL COOPER, OF YORKSHIRE CENTRE, NEW YORK.

HARROW.

SPECIFICATION forming part of Letters Patent No. 382,513, dated May 8, 1888.

Application filed December 7, 1887. Serial No. 257,189. (No model.)

*To all whom it may concern:*

Be it known that I, SAMUEL COOPER, of Yorkshire Centre, in the county of Cattaraugus and State of New York, have invented new and useful Improvements in Harrows, of which the following is a specification.

This invention relates to an improvement in spring-tooth harrows, and has the object to provide simple means for rendering the teeth adjustable, so that they can be raised or lowered on the harrow-frame to cause the teeth to enter the soil to a greater or less depth, and so that the angle of the teeth with reference to the soil can be changed.

The invention consists of the improvements which will be hereinafter described, and pointed out in the claims.

In the accompanying drawings, Figure 1 is a fragmentary top plan view of a harrow provided with my improvement. Fig. 2 is a sectional elevation on an enlarged scale in line $x\ x$, Fig. 1, showing one of the adjustments of the harrow-teeth. Fig. 3 is a similar view showing another adjustment of the teeth. Fig. 4 is a vertical cross-section in line $x\ x$, Fig. 2. Fig. 5 is a vertical cross-section in line $y\ y$, Fig. 2. Fig 6 is a perspective view of one of the tooth-holders. Fig. 7 is a perspective view of one of the filling-pieces.

Like letters of reference refer to like parts in the several figures.

A represents the diagonal bed-pieces, and A' the oblique cross-pieces, of the harrow-frame, which are secured together by vertical bolts $a$.

B represents the harrow-teeth, and C are the tooth-holders consisting of open rectangular frames or loops, which are arranged in grooves or depressions $a'$, formed in the adjacent portions of the bars A A' of the harrow-frame, the frames C being secured between said bars by the vertical bolts $a$, which pass through openings $c$, formed in the side bars of said frames or loops. The latter are composed of side bars, $d$, and end bars, $d'$. The tooth-holders C form supports for the upper or butt ends of the teeth, which are inserted either above or below the end bars of the tooth-holders, as may be necessary, in order to give the teeth the desired position. The tooth may be placed upon both end bars of the tooth-holder, in which position the tooth is at its greatest elevation; or it it may be placed below both end bars of the tooth-holder, as represented in Fig. 3, in which position the tooth is in its lowest position; or the tooth may be placed upon the front-end bar and below the rear-end bar of the holder, as represented in Fig. 2, in which position the point of the tooth stands at the most oblique angle to the surface of the soil; or the tooth may be placed below the front-end bar and upon the rear-end bar, in which position the point stands most nearly perpendicular. The end bars of the frames C are beveled inwardly, as shown in the drawings, to form inclined seats for the teeth, when the latter are arranged obliquely upon the tooth-holders.

$e$ represents longitudinal ribs formed on the upper and lower sides of the tooth-holders C, which bear against the sides of the grooves $a'$ of the bars A A' and form a lock whereby these bars are held against movement upon each other, thereby imparting greater firmness to the harrow-frame. These ribs also serve to hold the harrow-teeth against lateral displacement.

$f$ represents filling pieces or blocks, which are preferably inserted between the end bars of the tooth-holders C and the adjacent portions of the bars A A', so as to fill the spaces which are not occupied by the teeth and exclude dirt from the grooves $a'$. The filling-pieces $f$ are inclined or beveled to correspond to the bevel of the end bars of the tooth-holders, so that the filling-pieces will be held against outward movement when the tooth-holders are secured in place. The filling-pieces are provided at their outer ends with lips which project over the outer edges of the end bars of the tooth-holder and prevent the filling-pieces from moving inwardly. These filling-pieces also serve to support the end bars of the tooth-holders.

The tooth-holders may be provided with bosses or enlargements around the bolt-holes $c$ for strengthening the loops, which bosses enter recesses formed in the bars A A'. When the tooth-holders are applied to the upper side of the harrow-frame, they may be held in place by caps or cross-pieces, which take the place of the cross-bars A'.

I claim as my invention—

1. The combination, with the harrow-frame and a harrow-tooth, of a tooth-holder consisting of an open frame secured to the harrow-frame and composed of side bars and end bars, whereby the tooth can be clamped against either side of the tooth-holder or be passed through the same diagonally so as to bear against opposite sides of the end bars of the tooth-holder, substantially as set forth.

2. The combination, with the harrow-frame and a harrow-tooth, of a tooth-holder consisting of an open rectangular frame having its end bars beveled inwardly, forming inclined seats for the tooth on opposite ends of the frame, substantially as set forth.

3. The combination, with the bars of the harrow-frame provided in their adjacent portions with grooves or depressions for the reception of the teeth, of a tooth-holder secured in said grooves, and a harrow-tooth inserted between the tooth-holder and the adjacent portion of the harrow-frame, substantially as set forth.

4. The combination, with the bars of the harrow-frame, having grooves or depressions for the reception of the teeth, of a tooth-holder secured in said grooves, a harrow-tooth inserted between one side of the tooth-holder and the adjacent portion of the harrow-frame, and a filling-piece inserted between the opposite side of the tooth-holder and the adjacent portion of the harrow-frame, substantially as set forth.

Witness my hand this 25th day of November, 1887.

SAMUEL COOPER.

Witnesses:
CARL F. GEYER,
CHESTER D. HOWE.